United States Patent
Boiger et al.

(10) Patent No.: US 11,852,223 B2
(45) Date of Patent: Dec. 26, 2023

(54) DRIVE ARRANGEMENT OF A WORKING MACHINE TO BE DRIVEN WITH A VARIABLY ADJUSTABLE SPEED AND METHOD FOR OPERATING THE DRIVE ARRANGEMENT

(71) Applicant: RENK GmbH, Augsburg (DE)

(72) Inventors: Peter Boiger, Augsburg (DE); Michael Heider, Oberottmarshausen (DE)

(73) Assignee: RENK GmbH, Augsburg (DE)

( * ) Notice: Subject to any disclaimer, the term of this patent is extended or adjusted under 35 U.S.C. 154(b) by 0 days.

(21) Appl. No.: 17/851,703

(22) Filed: Jun. 28, 2022

(65) Prior Publication Data
US 2022/0412442 A1    Dec. 29, 2022

(30) Foreign Application Priority Data
Jun. 28, 2021   (DE) .................... 10 2021 206 701.8

(51) Int. Cl.
*F16H 37/08*   (2006.01)
*F16H 3/72*    (2006.01)
*B60K 17/04*   (2006.01)

(52) U.S. Cl.
CPC ......... *F16H 37/0806* (2013.01); *B60K 17/04* (2013.01); *F16H 3/72* (2013.01); *F16H 37/08* (2013.01); *F16H 3/724* (2013.01); *F16H 3/727* (2013.01)

(58) Field of Classification Search
CPC ........ F16H 37/0806; F16H 3/72; F16H 37/08; F16H 3/724; F16H 3/727
See application file for complete search history.

(56) References Cited

U.S. PATENT DOCUMENTS

| | | | |
|---|---|---|---|
| 2016/0327134 A1 | 11/2016 | Boiger et al. | |
| 2019/0113120 A1* | 4/2019 | Sten | F16H 1/28 |
| 2019/0226557 A1 | 7/2019 | Okamoto et al. | |
| 2020/0282820 A1* | 9/2020 | Waldner | H02P 5/753 |
| 2022/0170534 A1* | 6/2022 | Hannon | F16H 3/006 |

FOREIGN PATENT DOCUMENTS

| | | |
|---|---|---|
| DE | 10 2015 006 084 A1 | 11/2016 |
| DE | 11 2017 003 026 T5 | 3/2019 |
| WO | 2016/ 172 742 A1 | 11/2016 |

OTHER PUBLICATIONS

German Patent Office; Examination Report in related German Patent Application No. 10 2021 206 701.8 dated Feb. 18, 2022; 8 pages.

* cited by examiner

*Primary Examiner* — Richard W Ridley
*Assistant Examiner* — Aimee Tran Nguyen
(74) *Attorney, Agent, or Firm* — Dorton & Willis, LLP

(57) ABSTRACT

A drive arrangement of a working machine includes a differential gear, a first drive unit coupled to a first element of the differential gear, a working machine coupled to a second element of the differential gear, and a second drive unit coupled to a third element of the differential gear. The speed of the second drive unit can be superimposed on a speed that is dependent on the speed of the first drive unit, whereby the first or second drive unit can be driven at a variably adjustable speed. When a switching element is closed, an auxiliary gear stage is load-transmitting and speeds of the first and second drive units are coupled as a function of at least one transmission ratio of the auxiliary gear stage, and when the switching element is open, the auxiliary gear stage is load-free and speeds of the first and second drive units are decoupled.

11 Claims, 3 Drawing Sheets

DRIVE ARRANGEMENT OF A WORKING MACHINE TO BE DRIVEN WITH A VARIABLY ADJUSTABLE SPEED AND METHOD FOR OPERATING THE DRIVE ARRANGEMENT

CROSS-REFERENCE TO RELATED APPLICATIONS

This application claims the benefit of priority under 35 U.S.C. § 119(a) to German Patent Application 10 2021 206 701.8, filed Jun. 28, 2021, the disclosure of which is incorporated by reference in its entirety.

TECHNICAL FIELD

The invention relates to a drive arrangement of a working machine for driving the working machine with variably adjustable speed. Furthermore, the invention relates to a method for operating the drive arrangement.

BACKGROUND

From practice applications are known, in which a working machine, such as a compressor or a pump, must be operated at a variably adjustable speed. In practice, either electric motors with variable-frequency drive are used as drive units, or a gearbox with a hydraulically or electrically driven superimposed branch is used, with which a variable transmission ratio in the required range can be provided. Both possibilities known from practice for driving a working machine with variably adjustable speed are complex and expensive, and medium-voltage variable-frequency drive are necessary because of the high power required for the drive task.

DE 10 2015 006 084 A1 discloses a drive arrangement of a working machine for driving the working machine at a variably adjustable rotational speed, wherein the drive arrangement comprises a differential gear and two drive units in addition to the working machine. A first drive unit is coupled to a first element of the differential gear. The working machine is coupled to a second element of the differential gear. A second drive unit is coupled to a third element of the differential gear, wherein the speed of the second drive unit can be superimposed by a speed that is dependent on the speed of the first drive unit. The first drive unit or the second drive unit can be driven at a variably adjustable speed. This drive arrangement makes it possible to drive a working machine with variably adjustable rotational speed by simple and inexpensive means.

There is a need to create a drive arrangement of a working machine to be driven at a variably adjustable speed, preferably a drive arrangement in which the drive arrangement can be easily and safely ramped up to a nominal speed. Preferably, it is to be avoided that, when connecting a non-speed-adjustable drive unit to the mains, an excessively high inrush current is caused, which can lead either to mains disturbances or to overheating during start-up.

SUMMARY

On this basis, the present disclosure is based on the objective of creating a novel drive arrangement and a method for operating the drive arrangement. This objective is solved by a drive arrangement of a working machine to be driven at a variably adjustable speed, and a method for operating the drive arrangement as described herein.

The drive arrangement comprises a differential gear, a first drive unit coupled to a first element of the differential gear, a working machine coupled to a second element of the differential gear, and a second drive unit coupled to a third element of the differential gear, wherein the speed of the second drive unit can be superimposed on a speed dependent on the speed of the first drive unit. The first drive unit or the second drive unit can be driven at a variably adjustable speed.

The drive arrangement further comprises an auxiliary gear stage and a switching element interacting with the auxiliary gear stage, wherein, when the switching element is closed, the auxiliary gear stage is load-transmitting and the speeds of the first drive unit and second drive unit are coupled as a function of at least one transmission ratio of the auxiliary gear stage, and wherein, when the switching element is open, the auxiliary gear stage is load-free and decouples the speeds of the first drive unit and second drive unit. Via the auxiliary gear stage, the drive arrangement can advantageously be ramped up to nominal speed simply and reliably using the speed variability of the second drive unit.

In one embodiment, the switching element is an automatically switching, namely automatically closing and automatically opening, switching element such as a freewheel or a synchronous clutch. Thus, when the first drive unit is brought up to nominal speed during start-up, and then when the speed of the second drive unit reaches a safety-relevant overspeed, the switching element can close automatically and prevent a safety-critical failure of the drive arrangement. If the speed of the first drive unit is greater than the speed of the second drive unit, the switching element opens automatically. If, in the event of failure of a control device of the second drive unit, its speed becomes higher than that of the first drive unit, taking into account the gear ratio of the auxiliary gear stage, the switching element closes automatically. By using a switching element that switches automatically, a control unit can be dispensed with and safety-critical protection can be ensured simply and reliably by using mechanical components.

Alternatively, the switching element can also be an actively switching switching element such as a multi-plate clutch.

The auxiliary gear stage can be configured as an auxiliary planetary gear set. This is constructively simple and preferred.

In one embodiment, the switching element, in the closed state, couples either the second drive unit to an element of the auxiliary gear stage in a rotationally fixed manner or another element of the auxiliary gear stage to the first element or the second element of the differential gear in a rotationally fixed manner.

When the switching element is closed, the differential gear can no longer be operated as such, the differential gear then has a fixed ratio.

In one embodiment, in the closed state, the switching element couples the second drive unit to an element of the auxiliary gear stage in a rotationally fixed manner, another element of the auxiliary gear stage being permanently coupled to the first element of the differential gear in a rotationally fixed manner together with the first drive unit.

In another embodiment, it is provided that the second drive unit is permanently coupled in a rotationally fixed manner to an element of the auxiliary gear stage, wherein the switching element, in the closed state, couples another element of the auxiliary gear stage in a rotationally fixed manner to the first element of the differential gear.

These two advantageous embodiments of the invention are particularly beneficial. When the switching element is closed, the speed of the first drive unit to be run up to nominal speed by means of the second drive unit depends not only on the speed of the second drive unit but also exclusively on the transmission ratio of the auxiliary gear stage.

The gear ratio of the auxiliary gear stage is preferably selected so that at maximum speed of the second drive unit the first drive unit reaches its rated speed.

Further embodiments of the invention are apparent from the claims and the following description. Examples of embodiments of the invention are explained in more detail, without being limited thereto, by reference to the drawings.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

The invention relates to a drive arrangement of a working machine to be driven at a variably adjustable speed, wherein the working machine may be, for example, a compressor or a pump.

Figure 1:
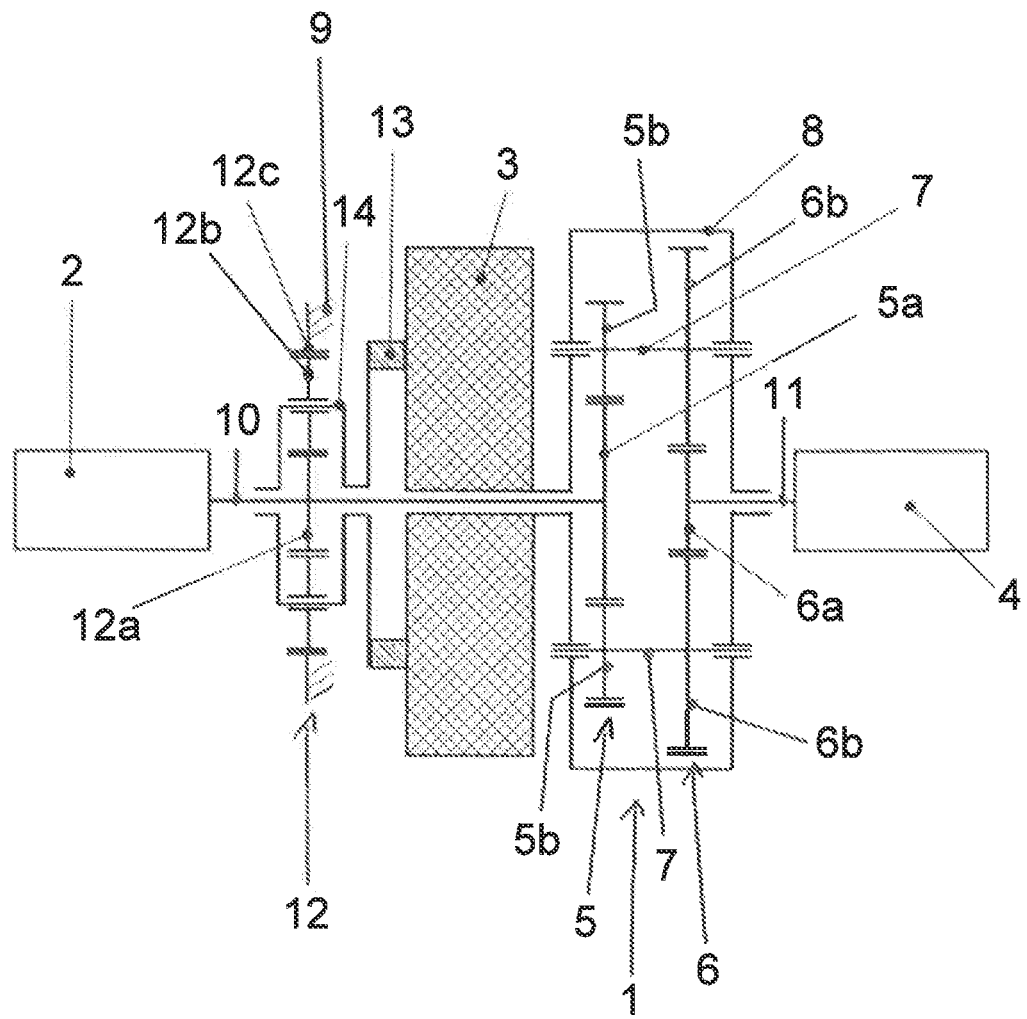
FIG. 1 is a block diagram of a first drive arrangement according to the present disclosure.

FIG. 1 shows a first exemplary embodiment of such a drive arrangement with a differential gear 1, a first drive unit 2, a second drive unit 3 and a working machine 4. The first drive unit 2 is also referred to as the main drive unit and the second drive unit 3 is also referred to as the superimposed drive unit. These drive units 2, 3 may each be electric machines. In the shown example of an embodiment, the differential gear 1 comprises a first planetary gear set 5 with a sun gear 5a and at least two planetary gears 5b, wherein the planetary gears 5b mesh with the sun gear 5a of the first planetary gear set 5. The differential gear 1 further comprises a second planetary gear set 6 comprising a sun gear 6a and at least two planetary gears 6b, wherein the planetary gears 6b mesh with the sun gear 6a. Two planetary gears 5b, 6b of each of the two planetary gear sets 5, 6 are arranged on a respective common planetary shaft 7, so that each of the planetary shafts 7 is accordingly coupled in a rotationally fixed manner to a planetary gear 5b of the first planetary gear set 5 and a planetary gear 6b of the second planetary gear set 6. In the differential gear 1 of FIG. 1, the planetary shafts 7 are rotatably mounted in a planet carrier 8, the planet carrier 8 being rotatably mounted in a rotationally fixed housing 9 not shown in detail, preferably via plain bearings not shown.

In the drive arrangement according to the present disclosure, the first drive unit 2, which is referred to as the main motor, is coupled to a first element of the differential gear 1 in such a way that the first drive unit 2 is permanently, directly and non-rotatably coupled to the first element of the differential gear 1 via a shaft 10, wherein in the embodiment example of FIG. 1, this first element of the differential gear 1 to which the first drive unit 2 is coupled is the sun gear 5a of the first planetary gear set 5.

It should be noted that the first planetary gear set 5 can also have a ring gear instead of the sun gear 5a, in which case the first drive unit 2 is coupled via the shaft 10 to the ring gear of the first planetary gear set 5, which then meshes radially outwardly with the planetary gears 5b.

The working machine 4 is coupled to a second element of the differential gear 1, and according to FIG. 1 in such a way that the working machine 4 is permanently, directly and non-rotatably coupled to the sun gear 6a of the second planetary gear set 6 via a shaft 11.

The second drive unit 3 engages a third element of the differential gear 1, whereby this third element of the differential gear 1, on which the second drive unit 3 engages, is the planet carrier 8 of the differential gear 1 in the example shown. The planet carrier 8 is therefore driven by the second drive unit 3, whose speed or drive power is superimposed on the speed or drive power of the first drive unit 2. The first drive unit 2 is preferably driven at a fixed or constant speed, whereas the second drive unit 3 is preferably driven at a variable speed. Thus, when the first drive unit 2 is running at the constant speed, a speed can be continuously superimposed on the speed dependent on the speed of the first drive unit 2, starting from the second drive unit 3, in order to set a variable speed at the working machine 4.

The drive arrangement according to the present disclosure comprises, in addition to the differential gear 1, the two drive units 2, 3 and the working machine 4, an auxiliary gear stage 12 and a switching element 13 cooperating with the auxiliary gear stage 12. Then, when the switching element 13 is closed, the auxiliary gear stage 12 is load-transmitting and the speeds of the first drive unit 2 and the second drive unit 3 are coupled, depending on the transmission ratio of the auxiliary gear stage 12.

Then, when the switching element 13 is closed, the speeds of the two drive units 2 and 3 are in a fixed ratio. The working machine 4 then also assumes a speed which is still dependent on the speed of the drive units 2, 3. If only the second drive unit 3 is supplied with electric current, the speed of the second drive unit 3 is decisive for all other speeds of the drive arrangement—the second drive unit 3 then drives the drive arrangement alone.

If, on the other hand, the switching element 13 is open, the auxiliary gear stage 12 is load-free and the speeds of the first drive unit 2 and second drive unit 3 are decoupled. The second drive unit 3 then only provides the superimposed partial of power and speed.

In the closed state, the switching element 13 thus acts in the sense of a lock for the differential gear 1 in order to lock one degree of freedom of the differential gear 1. This is used in particular for starting up the drive arrangement from a stationary first drive unit 2 in order to bring the first drive unit 2 up to its nominal speed from the second drive unit 3.

During such a start-up of the first drive unit 2, starting from the second drive unit 3 with the switching element 13 closed, the first drive unit 2 is de-energized; only after the rated speed of the first drive unit 2 has been reached is the first drive unit 2 then energized and then the switching element 13 opened.

The auxiliary gear stage 12 has a sun gear 12a, planet gears 12b and a ring gear 12c. The planet gears 12b are rotatably mounted on a planet carrier 14.

In FIG. 1, an element of the auxiliary gear stage 12, namely the sun gear 12a, together with the first drive unit 2 permanently, directly and non-rotatably engages the shaft 10 and thus the first element of the differential gear 1, in FIG. 1 the sun gear 5a of the first planetary gear set 5 of the differential gear 1.

Then, when the switching element 13 is closed, the switching element 13 in FIG. 1 couples the second drive unit 3 in a rotationally fixed manner to a second element of the auxiliary gear stage 12, namely in FIG. 1 to the planet carrier 14.

Accordingly, in the embodiment example of FIG. 1, the first drive unit 2 drives the sun gear 6a via the sun gear 5a and the planetary shafts 7 and the working machine 4 via the sun gear 6a. Via the rotatably mounted planet carrier 8 of the differential gear 1, in regular operation, starting from the second drive unit 3, a speed can be superimposed on the speed dependent on the speed of the first drive unit 2 at the shaft 11 in order to set a variable speed at the working machine 4.

In regular operation, namely when the first drive unit 2 is operated at its rated speed, the switching element 13 is open. However, in order to run up the drive arrangement, in particular starting from a state in which the first drive unit 2 is at a standstill, the switching element 13 is closed and the second drive unit 3 is coupled or connected in a rotationally fixed manner to the auxiliary gear stage 12 and to the shaft 10 via the switching element 13. Hereby, one degree of freedom of the differential gear 1 is locked and the start-up of the drive arrangement up to the nominal speed of the first drive unit 2, which is de-energized during start-up, is made possible by the second drive unit 3. The transmission ratio of the auxiliary gear stage 12 is selected such that at maximum speed of the second drive unit 3 the first drive unit 2 reaches its rated speed.

The switching element 13 can be a frictionally engaged switching element in the form of a friction clutch, such as a multi-plate clutch, or a form-fit switching element in the form of a claw clutch. If the switching element 13 is designed as a friction clutch, it can assume the function of a brake for the second drive unit 3 if the switching element 13 should fail during operation.

In one embodiment, the switching element 13 is designed as an automatically closing and automatically opening switching element 13, in particular as a freewheel or synchronous clutch, in which torque can be transmitted exclusively in one direction of rotation. Thereby, it can be achieved that the switching element 13 closes automatically when the drive arrangement 1 starts up, as well as in the event of a safety-critical failure of the second drive unit 3 during operation. If the speed of the first drive unit 2 is greater than the speed of the second drive unit 3, the switching element 13 opens automatically and the regular superimposed operation can begin.

As soon as the speed of the first drive unit 2 reaches its nominal speed, which is already running at its nominal speed when towed by the second drive unit 3 when it is switched on without a voltage peak, the switching element 13 can be opened.

In a self-shifting configuration of the switching element 13, this is done by reducing the speed of the second drive unit 3—taking into account the transmission ratio of the auxiliary gear stage12 designed as an auxiliary planetary gear set-relative to that of the first drive unit 2, in the case of a shifting clutch by opening the clutch. However, the self-shifting design of the switching element 13 as a synchronous clutch or freewheel is preferred.

The switching element 13 remains open throughout normal operation, i.e., when the first drive unit 2 is running at nominal speed. When using a self-shifting switching element 13, no safety-related control unit is required. Safety-critical functions can be provided by mechanical components, namely by the self-closing switching element 13. No actuator is required for locking the differential gear 1. The locking of the differential gear 1 takes place automatically. Also, no actuator is required for unblocking the differential gear 1. Then, when the speed of the first drive unit 2 is greater than the speed of the second drive unit 3, the switching element 13 is automatically opened. The auxiliary planetary set 12 always rotates at the speed of the first drive unit 2.

Figure 2:
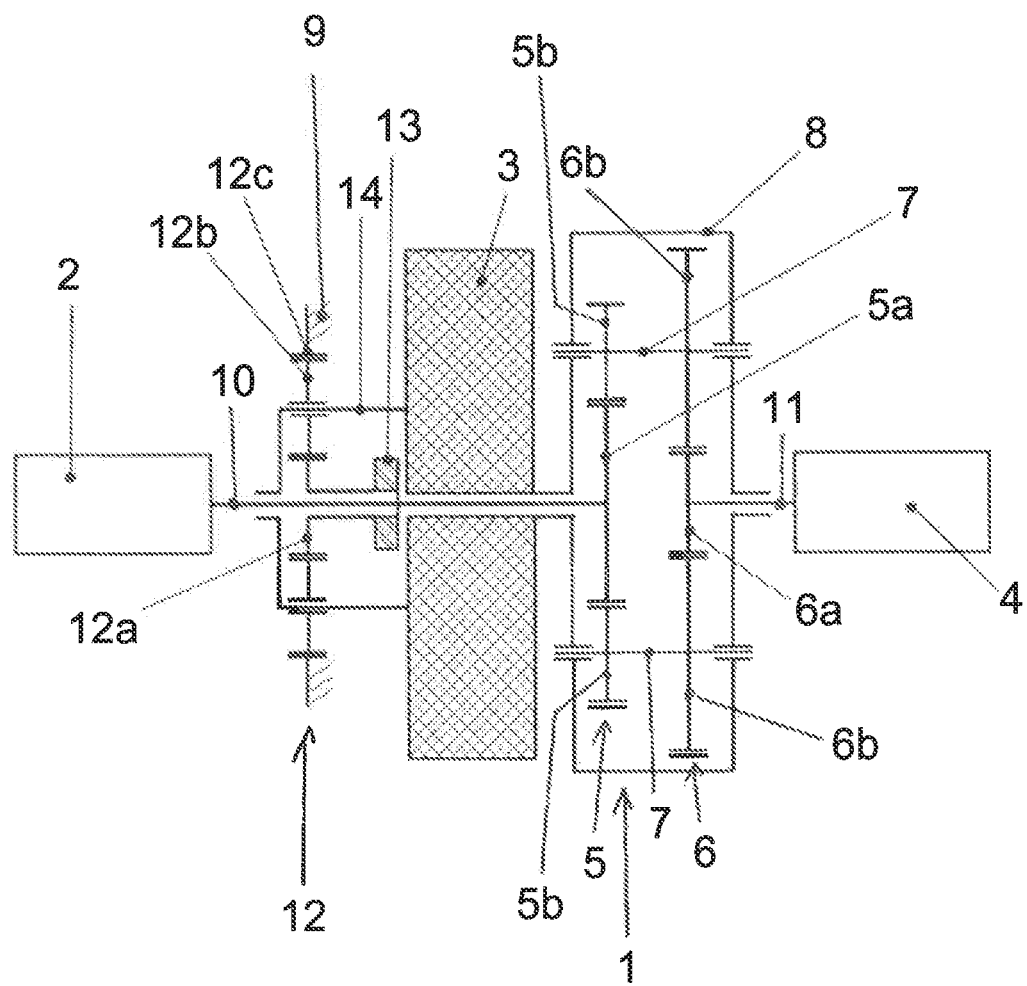
FIG. 2 is a block diagram of a second drive arrangement according to the present disclosure.

FIG. 2 shows a variation of the drive arrangement according to the present disclosure, in which the second drive unit 3 is permanently and non-rotatably coupled to an element of the auxiliary gear stage 12, namely to the planet carrier 14. Via the switching element 13, the sun gear 12a of the planet gear set 12 can be non-rotatably coupled to the first element of the differential gear 1, namely in FIG. 2 to the sun gear 5a of the first planet gear set 5 of the differential gear 1. Accordingly, in FIG. 2, the switching element 13 is connected between the sun gear 12a and the shaft 10. The auxiliary planetary gear set 12 always rotates at the speed of the second drive unit 3.

Figure 3:
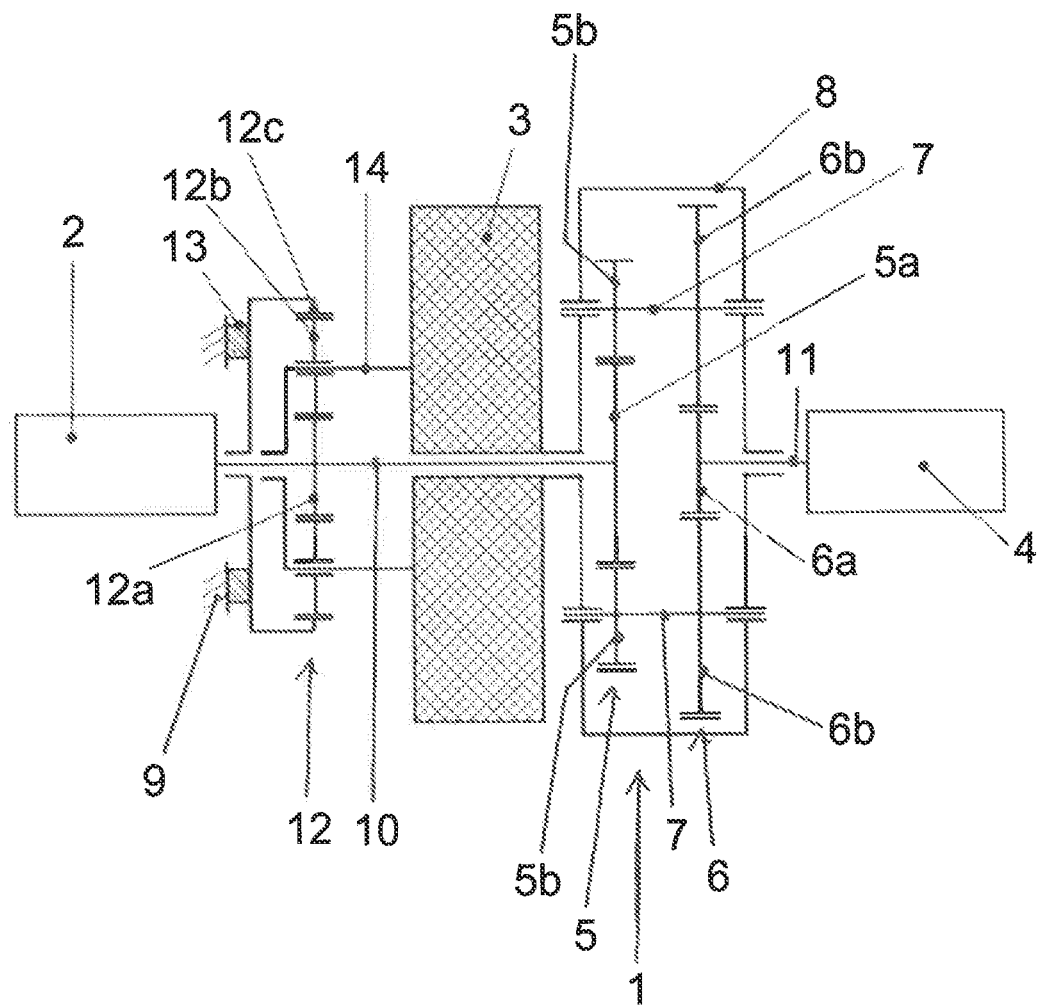
FIG. 3 is a block diagram of a third drive arrangement according to the present disclosure.

FIG. 3 shows a further example of a drive arrangement according to the present disclosure. Whereas in FIGS. 1 and 2 the ring gear 12c of the auxiliary gear stage 12 is permanently connected to the housing 9, in FIG. 3 the switching element 13 is connected between the housing 9 and the ring gear 12c of the auxiliary gear stage 12. In FIG. 3, the sun gear 12a of the auxiliary gear stage 12 is permanently coupled in a rotationally fixed manner to the shaft 10 and the electric machine 3 is permanently coupled in a rotationally fixed manner to the planet carrier 14 of the auxiliary gear stage 12. The speeds of the components of the auxiliary planetary gear stage 12 assume speeds determined by those of the two drive units 2, 3.

By closing the switching element 13, the ring gear 12c of the auxiliary gear stage 12 is coupled to the housing 9 to restrict a degree of freedom of the differential gear 1 and to use the second drive unit 3 to start up the first drive unit 2, and for this purpose load is then transmitted via the auxiliary gear stage 12, starting from the second drive unit 3 in the direction of the first drive unit 2.

The embodiments of FIGS. 1 to 3 have in common that an element of the auxiliary gear stage 12 is coupled to the second drive unit 3 either permanently (see FIGS. 1, 3) or switchably (see FIG. 2).

In contrast to this, it is also possible for the auxiliary gear stage 12 to interact with the shaft 11 on which the working machine 4 engages, either in such a way that an element of the auxiliary gear stage 12 is coupled to the shaft 11 either in a permanently rotationally fixed manner or in a switchable manner. In this case, the second drive unit 3 together with the auxiliary gear stage may be displaced to the other side of the differential gear 1 on which the shaft 11 runs. The second drive unit 3 and the auxiliary gear stage 12 can also be arranged on different sides of the differential gear 1.

A drive arrangement in accordance with the present disclosure allows the drive arrangement to be ramped up via the second drive unit 3, namely until the first drive unit 2 has reached its rated speed. Thus, only the second drive unit 3 requires an inverter. There is no need for a starting aid on the first drive unit 2. Then, when the switching element 13 closes automatically, a safety-related control device for controlling the switching element 13 can be dispensed with.

This may be achieved by using a synchronous clutch or a freewheel, which closes automatically to start up the drive arrangement and opens automatically.

Another aspect relates to a method for operating the drive arrangement according to the present disclosure. To start the drive arrangement, the switching element 13 is closed, preferably automatically, whereby the first drive unit 2, which is still de-energized, is then run up to its nominal speed via the second drive unit 3 with the switching element 13 closed and the auxiliary gear stage 12 transmits speed in the direction of the first drive unit 2. When the rated speed is reached at the first drive unit 2, first the first drive unit 1 is energized and then the switching element 13 is opened. The speed of the second drive unit 3 is reduced and the switching element 13 is opened, preferably automatically.

When designing the second drive unit 3, care should be taken to ensure that the working machine 4 develops an application-specific run-up torque which is related to its speed in a known function. This torque or the required power must be reliably provided by the second drive unit 3, although only for a short time until the first drive unit 2 is energized.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 Differential gear
2 first drive unit
3 second drive unit
4 Working machine
5 first planetary gear set
5a Sun gear
5b Planet gear
6 second planetary gear set
6a Sun gear
6b Planet gear
7 Planetary shaft
8 Planet carrier
9 Housing
10 shaft
11 shaft
12 Auxiliary gear stage
12a Sun gear
12b Planet gear
12c ring gear
13 Switching element
14 Planet carrier

What is claimed is:

1. A drive arrangement of a working machine to be driven at a variably adjustable speed, comprising
a differential gear;
a first drive unit coupled to a first element of the differential gear;
a working machine coupled to a second element of the differential gear;
a second drive unit coupled to a third element of the differential gear, such that the speed of the second drive unit can be superimposed on a speed that is dependent on the speed of the first drive unit;
wherein the first drive unit or the second drive unit are driveable at variably adjustable speeds;
an auxiliary gear stage; and
a switching element cooperating with the auxiliary gear stage and operable such that:
when the switching element is closed, the auxiliary gear stage is load-transmitting and the speeds of the first drive unit and the second drive unit are coupled as a function of at least one transmission ratio of the auxiliary gear stage, and
when the switching element is open, the auxiliary gear stage is load-free and the speeds of the first drive unit and the second drive unit are decoupled;
wherein one of:
(a) the second drive unit is permanently coupled in a rotationally fixed manner to a first element of the auxiliary gear stage,
a second element of the auxiliary gear stage, together with the first drive unit, is permanently coupled in a rotationally fixed manner to the first element of the differential gear, and
the switching element, in the closed state, couples a third element of the auxiliary gear stage to a housing; or
(b) the second drive unit is permanently coupled in a rotationally fixed manner to a fourth element of the auxiliary gear stage,
a fifth element of the auxiliary gear stage, together with the working machine, is permanently coupled in a rotationally fixed manner to the second element of the differential gear, and
the switching element, in the closed state, couples a sixth element of the auxiliary gear stage to the housing.

2. The drive arrangement of claim 1, wherein the auxiliary gear stage is designed as an auxiliary planetary gear set.

3. The drive arrangement of claim 1, wherein the switching element is a freewheel clutch or a synchronous clutch coupling.

4. The drive arrangement of claim 1, wherein the switching element switches automatically, and thereby closes automatically and opens automatically.

5. The drive arrangement of claim 1, wherein the switching element is a frictionally engaged clutch.

6. The drive arrangement of claim 1, wherein, in the closed state, the switching element couples either the second drive unit in a rotationally fixed manner to a seventh element of the auxiliary gear stage, or couples an eight element of the auxiliary gear stage in a rotationally fixed manner to the first element or the second element of the differential gear.

7. The drive arrangement of claim 1, wherein:
the differential gear comprises a first planetary gear set to which the first drive unit is coupled;
the differential gear comprises a second planetary gear set to which the working machine is coupled;
the first planetary gear set and the second planetary gear set each comprise planet gears which are arranged on at least two common planetary shafts which are mounted in a planet carrier; and
the planet carrier is rotatably mounted in the housing and is drivable by the second drive unit.

8. The drive arrangement of claim 7, wherein:
the first planetary gear set has a sun gear to which the first drive unit is coupled, and the sun gear of the first planetary gear set meshes with the planet gears of the first planetary gear set arranged on the planetary shafts; or
the first planetary gear set comprises a ring gear to which the first drive unit is coupled, and the ring gear of the first planetary gear set meshes with the planetary gears of the first planetary gear set arranged on the planetary shafts.

9. The drive arrangement of claim 7, wherein:
the second planetary gear set comprises a sun gear to which the working machine is coupled; and
the sun gear of the second planetary gear set meshes with the planet gears of the second planetary gear set arranged on the planet shafts.

10. The drive arrangement of claim 1, characterized in that the first drive unit is driveable at constant speed and the second drive unit is driveable at variable speed.

11. A method of operating a drive arrangement, the method comprising:
obtaining the drive arrangement according to claim 1;
starting the drive arrangement by closing the switching element such that the first drive unit, which is still deenergized, is run up to its rated speed via the second drive unit;
energizing the first drive unit when the rated speed is reached at the first drive unit; and
opening the switching element.

\* \* \* \* \*